US008300775B2

(12) United States Patent
Millett et al.

(10) Patent No.: US 8,300,775 B2
(45) Date of Patent: Oct. 30, 2012

(54) RESOLVING CALLING LINE IDENTIFICATION INFORMATION

(75) Inventors: Tom Millett, Seattle, WA (US); David Notario, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 213 days.

(21) Appl. No.: 12/760,796

(22) Filed: Apr. 15, 2010

(65) Prior Publication Data
US 2011/0255678 A1    Oct. 20, 2011

(51) Int. Cl.
*H04M 1/64* (2006.01)
*H04M 1/56* (2006.01)
*H04M 15/06* (2006.01)

(52) U.S. Cl. ............. 379/88.11; 379/88.19; 379/142.04; 379/142.06; 379/142.15; 379/142.17

(58) Field of Classification Search ............... 379/67.1, 379/68–70, 88.08, 88.11, 88.12, 88.14, 88.19, 379/88.2, 88.25, 88.26, 142.01, 142.04, 142.05, 379/142.14, 142.17, 93.17, 93.23, 245.247, 379/88.21, 142.06, 142.15
See application file for complete search history.

(56) References Cited

U.S. PATENT DOCUMENTS

| | | | | |
|---|---|---|---|---|
| 5,546,447 A * | 8/1996 | Skarbo et al. | ............. | 379/142.05 |
| H1941 H * | 2/2001 | Hoffpauir et al. | ........ | 379/265.13 |
| 6,324,272 B1 * | 11/2001 | Abu-Shukhaidem et al. | ......... | 379/142.06 |
| 6,421,672 B1 | 7/2002 | McAllister et al. | | |
| 6,434,224 B1 * | 8/2002 | Nagashima et al. | ....... | 379/93.23 |
| 7,007,239 B1 * | 2/2006 | Hawkins et al. | ............... | 715/780 |
| 7,187,932 B1 | 3/2007 | Barchi | | |
| 7,363,233 B1 | 4/2008 | Levine | | |
| 7,860,530 B2 * | 12/2010 | Katagiri et al. | ............ | 455/556.1 |
| 8,014,760 B2 * | 9/2011 | Forstall et al. | ............. | 455/412.2 |
| 8,135,389 B2 * | 3/2012 | Forstall et al. | ............. | 455/412.2 |
| 2001/0040942 A1 | 11/2001 | Glowny et al. | | |
| 2006/0159237 A1 * | 7/2006 | Clark et al. | .................. | 379/67.1 |
| 2007/0127638 A1 * | 6/2007 | Doulton | ....................... | 379/67.1 |
| 2007/0165790 A1 * | 7/2007 | Taori | ............................ | 379/67.1 |
| 2007/0297587 A1 * | 12/2007 | Urban et al. | ............ | 379/142.17 |
| 2008/0280595 A1 * | 11/2008 | Yu | .............................. | 455/412.2 |
| 2010/0150135 A1 * | 6/2010 | Keller et al. | .................. | 370/352 |
| 2011/0194629 A1 * | 8/2011 | Bekanich | ...................... | 375/259 |

OTHER PUBLICATIONS

The Easiest Reverse Cell Phone Number Lookup System That You Will Ever Use; ezinearticles.com/?The-Easiest-Reverse-Cell-Phone-Number-Lookup-System-That-You-Will-Ever-Use&id=1889224; Jan. 16, 2009, 4 pages.

(Continued)

*Primary Examiner* — Binh Tieu

(74) *Attorney, Agent, or Firm* — Merchant & Gould

(57) ABSTRACT

A computing device includes a processing unit and a system memory. The processing unit creates a normalization module programmed to modify a plurality of telephone numbers so that the telephone numbers conform to a specified format, creates a calling line manipulation module programmed to manipulate a calling line identification number to form a number for querying one or more databases including contact information, and creates a resource query module programmed to query the databases including the contacting information using the number, receive one or more query results from the databases, and select one of the query results for inclusion in a notification of a telephonic message.

18 Claims, 9 Drawing Sheets

OTHER PUBLICATIONS

Reverse Phone Call Lookup—Get the Name, Address of Any Phone Number!; www.goarticles.com/cgi-bin/showa.cgi?C=953771; Jun. 4, 2008, 2 pages.

Microsoft Office Communications Server 2007 Technical Overview Location Profiles; www.diraction.ch/shopdocs/files/OCS_Technical_Overview.pdf; Jul. 2007, 55 pages.

Visualization of Heterogeneous Data; www.stanford.edu/~klingner/publications/Visualization_of_Heterogeneous_Data.pdf; Mar. 31, 2007, 8 pages.

Reverse Cell Phone Directory Lookup & Search Tools; reversecellphonedirectory.net; Aug. 22, 2008, 4 pages.

\* cited by examiner

RESOLVING CALLING LINE IDENTIFICATION INFORMATION

BACKGROUND

Endpoints in a modern communication network, such as telephones and computers supporting telephony, are typically addressed by a unique string of characters. For example, a telephone endpoint may be addressed by a unique telephone number. Such telephone numbers are typically entered into databases, such as contact lists, for easy access. However, these numbers are typically entered in a non-standardized format, which may preclude an efficient database query for the purpose of calling line identification resolution when a call is received at the endpoint.

SUMMARY

The present application is directed to systems and methods for resolving calling line identification information to contact information contained in data stores accessible within a computing system environment.

In one aspect, a computing device is programmed to deliver notification of a telephonic message, the computing device including a processing unit, and a system memory connected to the processing unit, the system memory including instructions that, when executed by the processing unit, cause the processing unit to: create a normalization module programmed to modify a plurality of telephone numbers so that the telephone numbers conform to a specified format; create a calling line manipulation module programmed to manipulate a calling line identification number to form a number for querying one or more databases including contact information; and create a resource query module programmed to query the databases including the contacting information using the number, receive one or more query results from the databases, and select one of the query results for inclusion in a notification of a telephonic message.

In another aspect, a method for resolving calling line identification information includes: formatting a contact list; inverting remaining digits of each telephone number entry in the contact list; receiving a calling line identification number associated with a voicemail message; formatting the calling line identification number; querying the contact list based on the formatted calling line identification number; reviewing the query results to identify an unambiguous result; and generating a notification to include contact information from the unambiguous result.

In yet another aspect, a computer readable storage medium has computer-executable instructions that, when executed by a computing device, cause the computing device to perform steps comprising: removing white spaces and punctuation from each telephone number entry in a contact list; discarding digits preceding a non-numeric character in each telephone number entry; inverting remaining digits of each telephone number entry in the contact list; receiving a calling line identification number associated with a voicemail message; formatting the calling line identification number; applying a numbering plan mask to the calling line identification number; removing optional prefixes from the calling line identification number; inverting the calling line identification number to form a formatted calling line identification number; performing a prefix-based query on the contact list based on the formatted calling line identification number; reviewing the query results to identify an unambiguous result; and generating a notification to include rich contact information from the unambiguous result.

This Summary is provided to introduce a selection of concepts, in a simplified form, that are further described below in the Detailed Description. This Summary is not intended to identify key or essential features of the claimed subject matter, nor is it intended to be used in any way to limit the scope of the claimed subject matter.

DESCRIPTION OF THE DRAWINGS

Aspects of the present disclosure may be more completely understood in consideration of the following detailed description of various embodiments in connection with the accompanying drawings.

DETAILED DESCRIPTION

The present disclosure is directed to systems and methods for resolving calling line identification information to contact information contained in data stores accessible within a computing system environment. The resolved information is subsequently presented to a called party to provide context and contact information related to a calling party.

The following example embodiments are described herein with respect to the Microsoft Exchange Server from Microsoft Corporation of Redmond, Wash. However, the systems and methods of the present disclosure are applicable to any situation in which it is desirable to correlate structured or unstructured information contained in an electronic message to information contained in one or databases accessible within a computing system environment.

Figure 1:
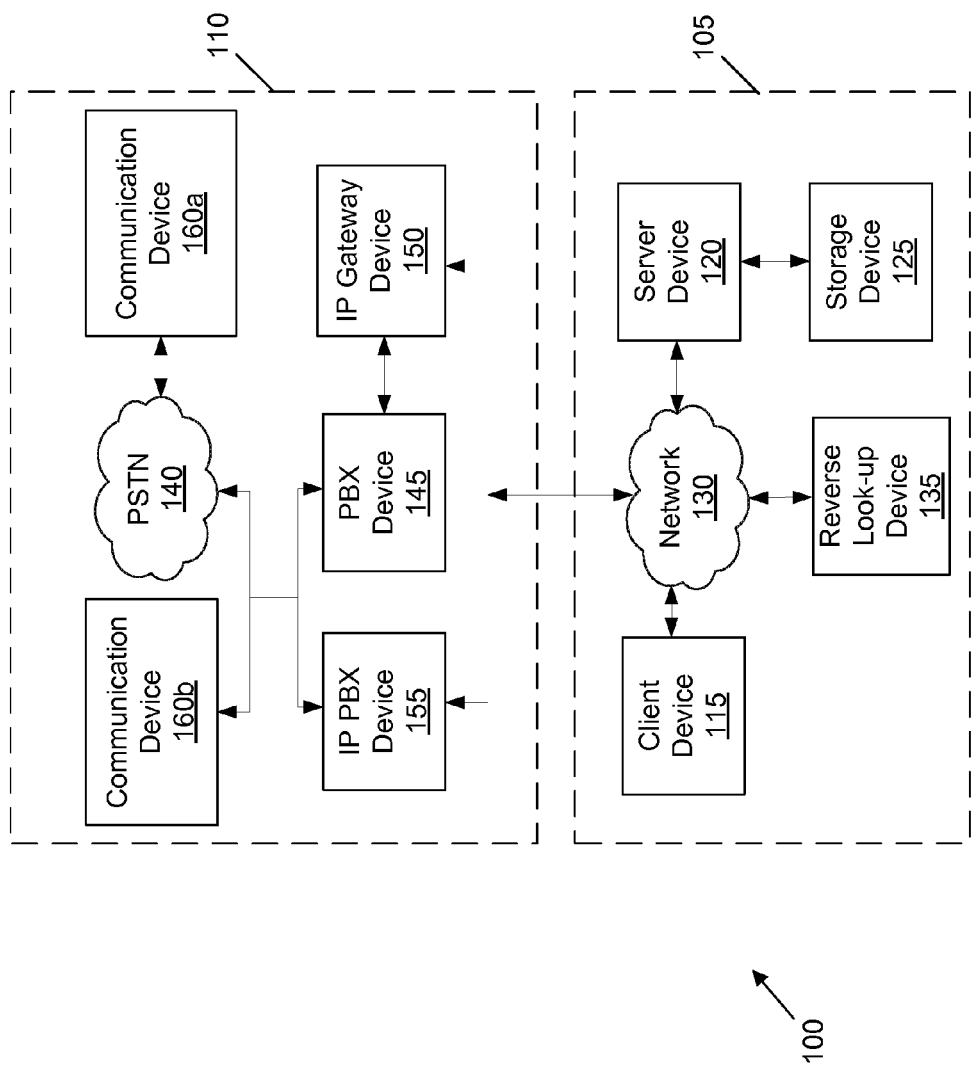
FIG. 1 shows a first example networked environment.

FIG. 1 shows a networked environment 100 configured according to the principles of the present disclosure. The example environment 100 includes a dedicated IP-based packet-switched branch 105 and a telephony branch 110.

The example packet-switched branch 105 includes a client device 115, a server device 120, a storage device 125, a network 130, and a reverse look-up device 135. However, other embodiments are possible as well. For example, the packet-switched branch 105 may generally include more or fewer devices, networks, and other components as desired.

The client device 115 and the server device 120 are general purpose computing devices, such as described below with reference to FIG. 2. In example embodiments, the server device 120 is a business server that implements business processes. Example business processes include messaging and collaborative processes, data management processes, and others. Microsoft Exchange Server from Microsoft Corporation is an example of a business server that implements messaging and collaborative business processes in support of electronic mail, voice messaging, in support of mobile and web-based access to information, and in support of data storage. In some embodiments, the server device 120 includes a plurality of interconnected server devices operating together to implement business processes. Other embodiments of the server device 120 are possible.

The storage device 125 is an electronic data storage device, such as a relational database or any other type of persistent data storage device. In example embodiments, the storage device 125 stores data in a predefined format such that the server device 120 can query, modify, and manage electronic data stored thereon. Example electronic data includes information related to directory services, authentication services, administration services, and other services such as the ACTIVE DIRECTORY® directory service from Microsoft Corporation. In some embodiments, the storage device 125 includes a plurality of data storage devices logically grouped together in an interconnected configuration. Other embodiments of the storage device 125 are possible.

The network 130 is a bi-directional data communication path including any of a number of wireless or hardwired WAN, LAN, Internet, or other packet-based communication networks for data transfer between one or more compatibly configured devices. In the example embodiment, the network 130 establishes a communication path for data transfer between the client device 115, server device 120, and the reverse look-up device 135. The network 130 additionally establishes a communication path for data transfer between components of the packet-switched branch 105 and components of the telephony branch 110, as described in further detail below. Other embodiments of the network 130 are possible.

The reverse look-up device 135 is general purpose computing device, such as described below with reference to FIG. 2. In example embodiments, the reverse look-up device 135 is configured to host a service that queries data stores and devices connected to the network 130 to retrieve information. For example, in some embodiments, the reverse look-up device 135 is configured to host a reverse telephone look-up service that retrieves information related to a given telephone number. However, other embodiments are a possible. For example, in some embodiments, the reverse look-up device 135 is a web site that accepts a partial or full telephone number as input and provides contact information about that telephone number, such as owner name and/or address information. Still other embodiments are possible as well.

The example telephony branch 110 includes a Public Switched Telephone Network (PSTN) 140, a private branch exchange (PBX) device 145, an IP gateway device 150, an IP PBX device 155, and a plurality of communication devices 160a-b (collectively, communication device 160). However, other embodiments are possible as well. For example, the telephony branch 110 may generally include more or fewer devices, networks, and other components as desired.

The PSTN 140 is bi-directional circuit-switched communication network in which multiple communications are transmitted across a similar transmission medium such as, for example, copper, fiber optic cable, and others. In the example embodiment, the PSTN 140 establishes a communication path between the communication devices 160a-b in the telephony branch 110. The PSTN 140 additionally establishes a communication path for data transfer between components the communication device 160a and components of the packet-switched branch 105, as described in further detail below. Other embodiments of the network 130 are possible.

The PBX device 145 is a telephony device based on circuit-switch protocols that switch communications in a telephony or circuit-switched network such as, for example, the PSTN 140. In general, the PBX device 145 is incompatible with packet-based communication networks. The IP gateway device 150 is a device configured to convert circuit-switch protocols used by the PBX device 145 to IP-based protocols. In this manner, the IP gateway device 150 enables communications between the communication devices 160a-b and respective devices of the packet-switched branch 105 via the PBX device 145.

The IP PBX device 155 is a telephony device that switches communications in networks based on circuit-switch protocols as well as networks that leverage IP-based protocols. In this manner, the PBX device 145 is compatible with both circuit-switched communication networks and packet-based communication networks. In the example embodiment, the IP PBX device 155 enables communications between the communication devices 160a-b and respective devices of the packet-switched branch 105 directly via the IP PBX device 155.

In general, the communication device 160 is telephony device. Example telephony devices include a telephone, a fax machine, a personal computer, and other devices. In some embodiments, the communication device 160 is a push-button telephone or rotary dial telephone. In other embodiments, the communication device 160 is a general purpose computing devices, such as described below with reference to FIG. 2. Still other embodiments of the communication device 160 are possible as well.

Figure 2:
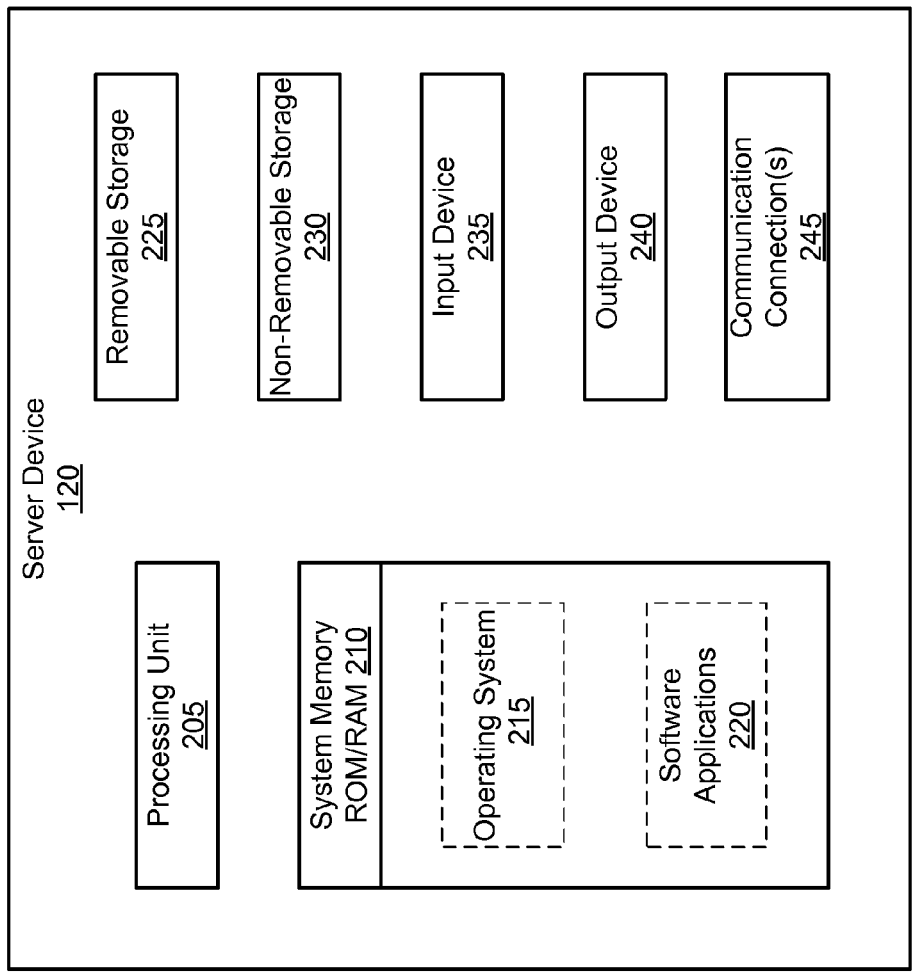
FIG. 2 shows an example server device from the environment of FIG. 1.

Referring now to FIG. 2, the server device 120 of FIG. 1 is shown in further detail. As mentioned above, the server device 120 is a general purpose computing device. Example general purpose computing devices include a desktop computer, a laptop computer, a personal data assistant, a smartphone, a cellular phone, and any other type of computing devices.

The server device 120 includes at least one processing unit 205 and system memory 210. The system memory 210 can store an operating system 215 for controlling the operation of a computing device. One example operating system 215 is the WINDOWS® operating system from Microsoft Corporation.

The system memory 210 may also include one or more software applications 220 and may include program data. Software applications 220 may include many different types of single and multiple-functionality programs, such as an electronic mail program, a calendaring program, an Internet browsing program, a spreadsheet program, a program to track and report information, a word processing program, an instant messaging program, a web conferencing service program, and many others. One example program is the Office suite of applications from Microsoft Corporation. Another example program is a server, such as Exchange Server also from Microsoft Corporation. Still other programs are possible as well.

The system memory 210 can include computer readable media. An example computer readable media includes computer readable storage media. Other example computer readable media includes communication media.

Computer readable storage media include physical media. Such physical media is illustrated in FIG. 2 by removable storage 225 and non-removable storage 230. Computer readable storage media can include physical volatile and nonvolatile, removable and non-removable media implemented in any method or technology for storage of information, such as computer readable instructions, data structures, program modules, or other data. Computer readable storage media can also include, but is not limited to, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by server device 120. Any such computer storage media may be part of or external to the server device 120.

Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, communication media includes wired media such as a wired network or direct-wired connection, and wireless media such as acoustic, RF, infrared and other wireless media.

The server device 120 can also have any number and type of input devices 235 and output devices 240. Example input devices 235 include a keyboard, mouse, pen, voice input device, touch input device, and others. Example output devices 240 include a display, speakers, printer, and others. The server device 120 can also include a communication connection 245 configured to enable communications with other computing devices over a network (e.g., network 130) in a distributed computing environment.

In some embodiments, the client device 115, communication device 160, and reverse look-up device 135 of FIG. 1 are configured similar to the server device 120 as described above.

Figure 3:
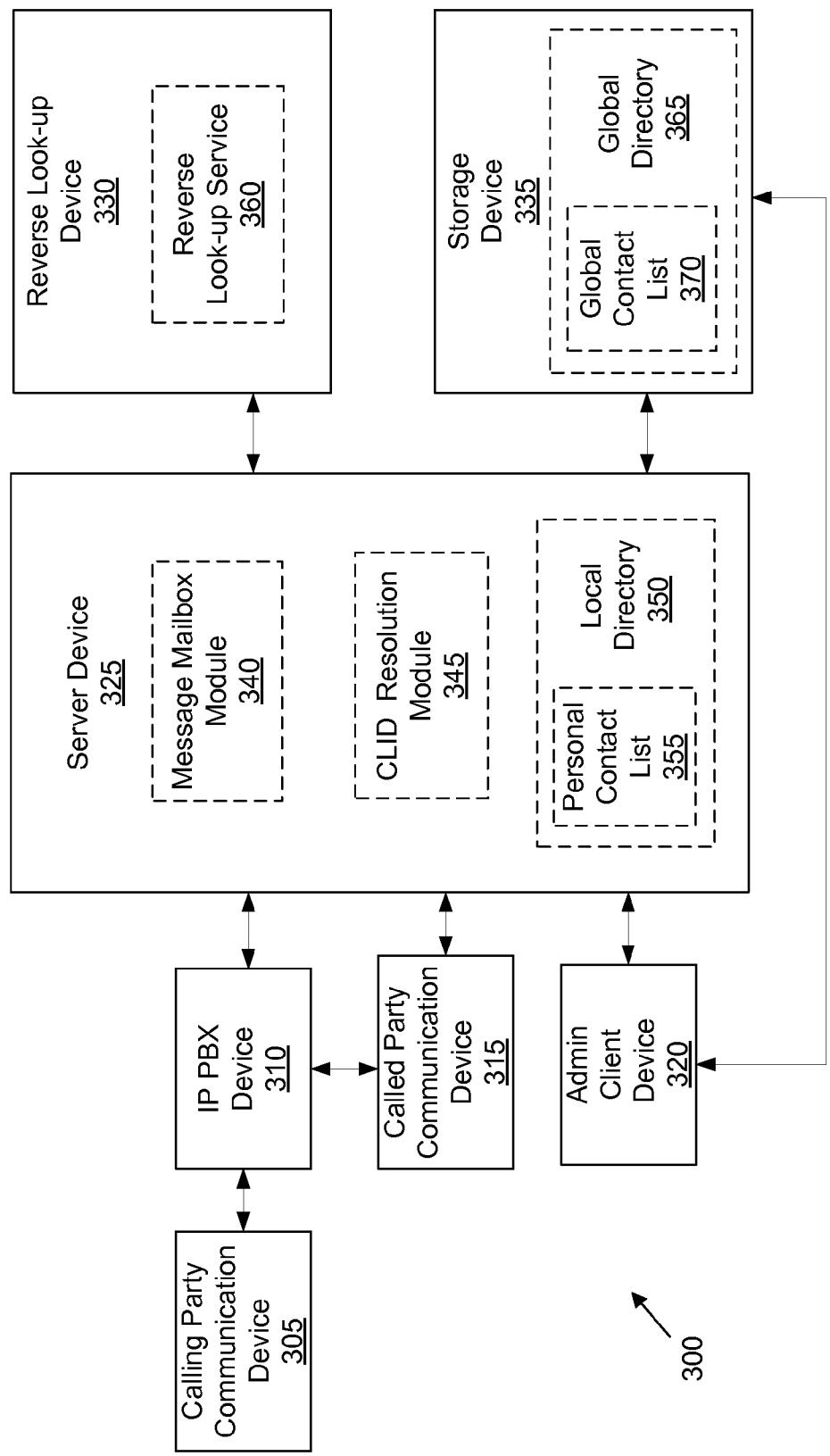
FIG. 3 shows a second example networked environment.

Referring now to FIG. 3, a networked environment 300 illustrates an example for resolving or correlating a calling line identification (CLID) of a calling party to contact information contained in various data stores in accordance with the present disclosure.

In general, the example environment 300 includes components configured similar to corresponding components of the networked environment 100 described above with respect to FIGS. 1 and 2. For example, the networked environment 300 includes a calling party communication device 305, an IP PBX device 310, a called party communication device 315, an administrator client device 320, a server device 325, a reverse look-up device 330, and a storage device 335. In the example embodiment of FIG. 3, the server device 325 includes a plurality of logical modules including a message mailbox module 340, a CLID resolution module 345, and a local directory 350. The local directory 350 includes a personal contact list 355. The reverse look-up device 330 includes a reverse look-up service 360. The storage device 335 includes a global directory 365, which contains a global contact list 370.

In one aspect, the calling party device 305 places a phone call to the called party device 315. The phone call is received at the IP PBX device 310 and routed to the called party device 315. In event the called party device 315 is unavailable to take the phone call from the calling party device 305, the phone call is rerouted from the IP PBX device 310 to the message mailbox module 340 of the server device 325.

The example message mailbox module 340 includes logical modules of software executing on the server device 325 for processing a phone call as routed from the IP PBX device 310. For example, referring now additionally to FIG. 4, the message mailbox module 340 includes a recordation module 400 and a notification module 405.

The example recordation module 400 is configured to record voice messages and extract a CLID from associated voice messages received by the message mailbox module 340. For example, the recordation module 400 is configured to record a voice message 410 from the calling party device 305 to the called party device 315 and further extract a CLID 415 from the voice message 410. The example CLID 415 contains information associated with the calling party device 305. Example CLID information includes at least a portion of a telephone number associated with the calling party device 305.

For example, the CLID 415 may include a telephone extension "52837" in accordance with a dial plan to which the called party device 315 subscribes. In general, a dial plan is a management object that an administrator creates and maintains that at least contains properties common to a set of telephone numbers and extensions, typically geographically co-located. In the example embodiment, the calling party device 305 and the called party device 315 are on a similar dial plan as implemented by the IP PBX device 310. Other CLID information is possible as well. For example, CLID information may include a user name associated with a calling party device.

The example notification module 405 is generally configured to forward a notification message to a called party communication device containing a voice message and contact information associated with a CLID as extracted from a respective voice message. For example, the notification module 405 is configured to forward a notification message 420 to the called party device 315 containing: a) the voice message 410 left from calling party device 305; and b) contact information 425 associated with the CLID 415 as extracted from the voice message 410.

In some embodiments, the notification module 405 retrieves contact information from one or more of the local directory 350 and the global directory 365. In other embodiments, contact information is transferred to the notification module 405 by the reverse look-up service 360. Example contact information includes calling party name, address, title, e-mail address, phone number, on-line status, and other information such as described below in connection with FIG. 9.

Referring again to FIG. 3, the example CLID resolution module 345 includes logical modules of software executing on the server device 325 for resolving contact information associated with a respective CLID for insertion within notification messages generated by the notification module 405.

Figure 5:
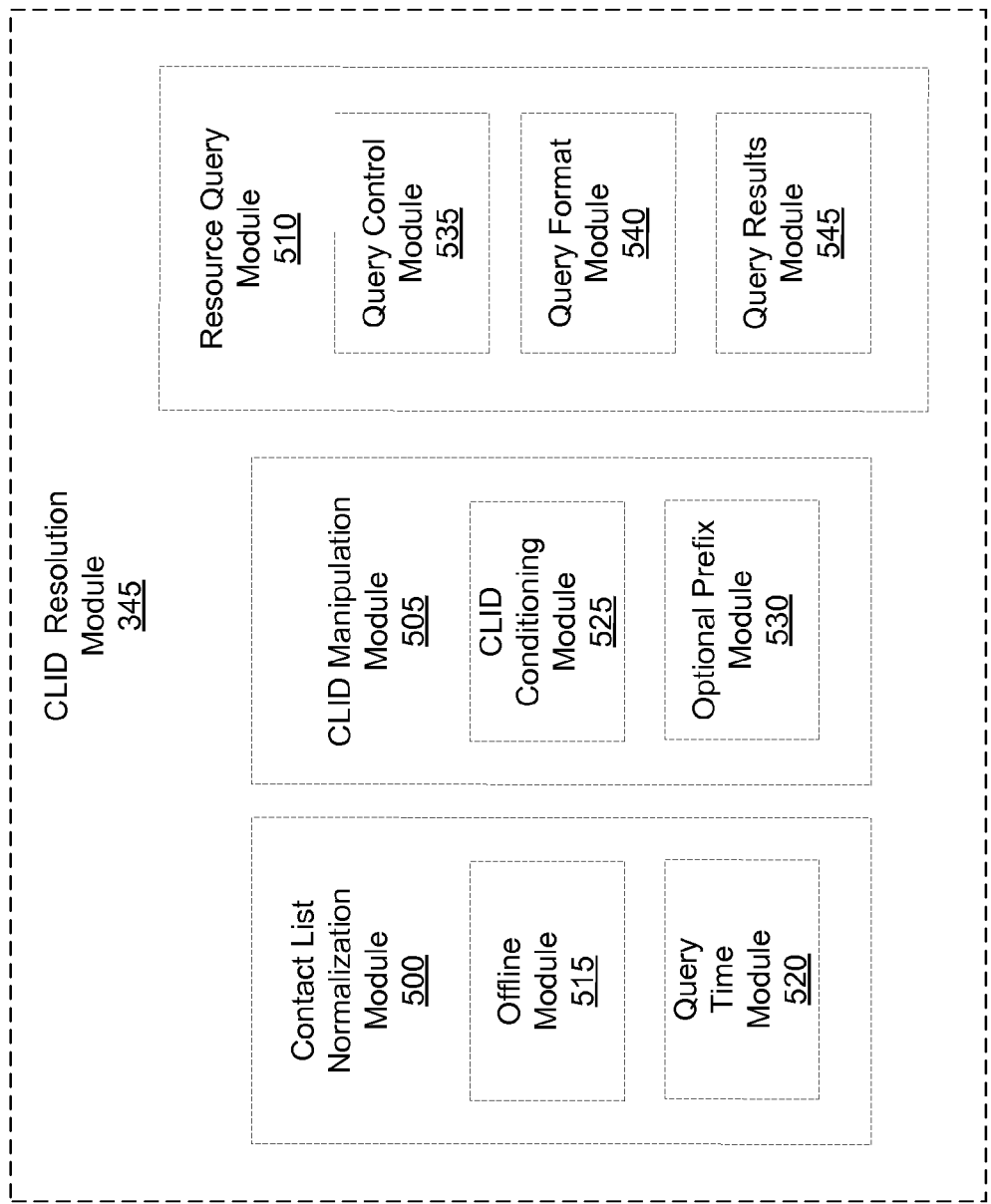
FIG. 5 shows example logical modules of a calling line identification (CLID) resolution module of the server device of FIG. 3.

For example, referring now additionally to FIG. 5, the CLID resolution module 345 includes a contact list normalization module (CLN module) 500, a CLID manipulation module (CMM module) 505, and a resource query module (RQM module) 510.

The example CLN module 500 is configured to normalize telephone numbers contained in a database defined by the personal contact list 355 of the local directory 350 and the global contact list 370 of the global directory 365.

In the example shown, the personal contact list 355 contains at least a list of telephone numbers of personal contacts of a user of the called party device 315. In general, the personal contact list 355 may be modified and managed via the called party device 315. For example, in one embodiment, the personal contacts are contacts stored in an address book associated with the user's Outlook messaging and collaboration software from Microsoft Corporation. Such contacts can be stored locally on the called party device 315, as well as stored at the Exchange Server on the server device 325. Other embodiments are possible.

The global contact list 370 contains at least a list of telephone numbers of contacts of an organization, such as a business enterprise, in which the user of the called party device 315 is a member of the organization. In general, the global contact list 370 may be modified and managed by an administrator via the administrator client device 320. In one example, the global contact list 370 is stored in an ACTIVE DIRECTORY® directory service from Microsoft Corporation. Other embodiments are possible.

In some embodiments, the administrator client device 320 accesses the global contact list 370 of the global directory 365 by indirect connection via the server device 325. In other embodiments, the administrator client device 320 accesses the global contact list 370 of the global directory 365 by direct connection (see FIG. 3).

Telephone numbers of the personal contact list 355 and the global contact list 370 may generally be entered, managed, and modified in accordance with any of a variety of non-standard and/or non-conformal formats. For example, a telephone number "13035552837" may be entered into the personal contact list 355 and/or the global contact list 370 in accordance with any of the following formats.

1 (303) 555-2837 x 52837
(303) 555-2837 x 52837
(303) 555-2837 ext. 52837
303-555-2837
555-2837
303.555.2837
303 555 2837
x 52837

Other various forms of telephone number entries are possible as well. For example, some entries may include international telephone numbers entered in any conceivable format. Other telephone entries may include various punctuation such as a period, comma, colon, hyphen, dash, parenthesis, ellipsis, apostrophe, slashes, and other punctuation marks either purposefully or inadvertently inserted within a telephone number entry. Still other telephone entries may include a string of alphanumeric characters that do not represent a telephone number.

In this manner, entry of telephone numbers into the personal contact list 355 and the global contact list 370 is generally non-restrictive and contains "noise" that may preclude efficient database indexing of respective telephone number entries.

Additionally, significant digits of a telephone phone number proceed right to left. For example, the digits "2837" of the example telephone number "13035552837" are more significant than the area code digits "303". Resolving contact information (e.g. contact information 420) for insertion within notification messages based on a telephone entry of "13035552837" may be preclude efficient querying of a CLID against respective telephone number entries. For example, a suffix-based query (i.e., matching characters of a string from right to left) such as "return all records that contain phone numbers ending with "13035552837" may be inefficient. In contrast, a prefix-based query (i.e., matching characters of a string from left to right) is an efficient method for querying entries of some databases, such as the ACTIVE DIRECTORY® directory service.

The example CLN module 500 is configured to address these and other issues. For example, the CLN module 500 is configured to convert telephone number entries of the personal contact list 355 and the global contact list 370 into a list of normalized indexed values in anticipation of a prefix-based query of a CLID against the normalized indexed values. In some embodiments, the example conversion process includes at least removing punctuation and whitespaces from telephone number entries, discarding digits of a telephone number appearing to the right of non-numeric character, and then inverting the converted number for storage in a multi-valued, indexed database property.

For example, a telephone number entered by an administrator via the administrator client device 320 into the global contact list 370 as "1 (303) 555-2837 x 52837" would be normalized and indexed by the example CLN module 500 as follows.

13035552837 x 52837 (remove white spaces and punctuation)
13035552837 (discard digits to the right of non-numeric character "x")
73825553031 (invert the converted telephone number)

In some embodiments, the normalized telephone number "73825553031" is then stored in the global contact list 370 for a subsequent prefix-based query. In other embodiments, the telephone number "1 (303) 555-2837 x 52837" is only temporarily normalized and indexed in accordance with the above algorithm for an "on-demand" prefix-based query.

For example, the CLN module 500 includes an offline module 515 and a query time module 520 configured to perform the conversion of telephone numbers of one or both of the personal contact list 355 and the global contact list 370 into a list of normalized indexed values. In some embodiments, the example offline module 515 is configured to at least periodically convert telephone numbers of one or both of the personal contact list 355 and the global contact list 370 into a list of normalized indexed values in a batch or "off-line" normalization and indexing process, such as described further below in connection with FIG. 6. In other embodiments, the example offline module 515 is configured to convert a telephone number immediately following entry of the telephone number entered by the administrator via the administrator client device 320 into the global contact list 370, as described above.

In contrast, the example query time module 520 is configured to convert telephone numbers of one or both of the personal contact list 355 and the global contact list 370 into a list of normalized indexed values in an "on-demand" normalization and indexing process, as described in further detail below in connection with FIG. 7.

As mentioned above, the CLID resolution module 345 additionally includes a CMM module 505. The example CMM module 505 is generally configured to operate on a CLID to facilitate a successful query to match the CLID to one or more telephone numbers contained in the database defined by the personal contact list 355, the global contact list 370, and one or more databases accessed by the reverse look-up service 360 of the reverse look-up device 330. For example, the CMM module 505 can manipulate the calling line identification number to form a number that is optimized for querying the noted databases.

For example, the CMM module 505 includes a CLID conditioning module 525 and an optional prefix module 530.

The example CLID conditioning module 525 is configured to acquire a CLID extracted from a respective voice message by the recordation module 400, extend the acquired CLID, and present the result to the optional prefix module 530. For example, in one embodiment, the CLID conditioning 525 is configured to apply a numbering plan mask to a CLID to convert an extension length CLID to an outside dialable number. For example, a numbering plan mask of "1303555xxxx" applied to a CLID corresponding to telephone extension "52837" of calling party device 305, as described above, would convert the CLID presented as "52837" to an extended form "13035552837". Extension of an acquired CLID via a numbering plan mask helps to reduce ambiguity associated with telephone extensions on different numbering plans.

In the example embodiment, the numbering plan mask "1303555xxxx" is an object of a specific dial plan and thus defined and added to the IP PBX device 310 by an administrator via the administrator client device 320. In example embodiments in which a numbering plan format is defined, the CLID conditioning module 525 attempts to extend an acquired CLID and then pass the extended CLID to the optional prefix module 530. Otherwise, the CLID is passed to the optional prefix module 530 as acquired.

The example optional prefix module 530 is configured to analyze the CLID received from the CLID conditioning module 525 to determine if the received CLID contains prefixes that may be considered optional for the purpose of CLID resolution against telephone numbers contained in the personal contact list 355, the global contact list 370, and one or more databases accessed by the reverse look-up service 360. Example optional prefixes include a country code, a national number prefix, and an international access code.

For example, when the national number prefix "1" of the CLID "13035552837" matches the national number prefix of the called party device 315, the optional prefix module 530 is configured to remove the prefix "1" of telephone number "13035552837". This is beneficial if the personal contact list 355, the global contact list 370, and/or one or more databases accessed by the reverse look-up service 360 contain a telephone number entry corresponding to "3035552837".

For example, a query submitted as "13035552837" may not return a positive result if the personal contact list 355, the global contact list 370, and/or one or more databases accessed by the reverse look-up service 360 contain a telephone number entry corresponding to "3035552837" since the entry, or record, does not include the national number prefix "1". In contrast, a query submitted as "3035552837" may return a positive result including "3035552837" and "13035552837" if the personal contact list 355, the global contact list 370, and/or one or more databases accessed by the reverse look-up service 360 contain the telephone number entry corresponding to "3035552837" since both of the noted records include the string "3035552837". Such multiple query results are then analyzed to select a least ambiguous entry, as described in further detail below.

In some embodiments, one or more of the country code, national number prefix, and international access code are considered optional only if a CLID of a calling party device shares similar values to a dial plan of a called party device, which is true for all "in-country" phone calls. For example, when a calling party device having a CLID "+44 1234 5678" places a call to a called party device "1 303 555 2837", as defined on a corresponding dial plan, the country code "+44" may not be considered optional. However, when a calling party device having a CLID "+1 123 456 7899" places a call to a called party device "1 303 555 2837", the country code "+1" may be considered optional. This is beneficial, for example, as one or more of the country code, national number prefix, and international access code may not be entered into a contact list for a given contact, such an omission may either be inadvertent or intentional. In other examples, a contact list may include one or more of the country code, national number prefix, and international access code for a given contact, but a CLID may not include information corresponding to a country code, national number prefix, or international access code.

In example embodiments in which one or more optional prefixes of a CLID received from the CLID conditioning module 525 are removed, the optional prefix module 530 passes a reduced CLID to the RQM module 510, as described further below. Otherwise, the CLID is passed to the RQM module 510 as acquired from the CLID conditioning module 525.

Figure 4:
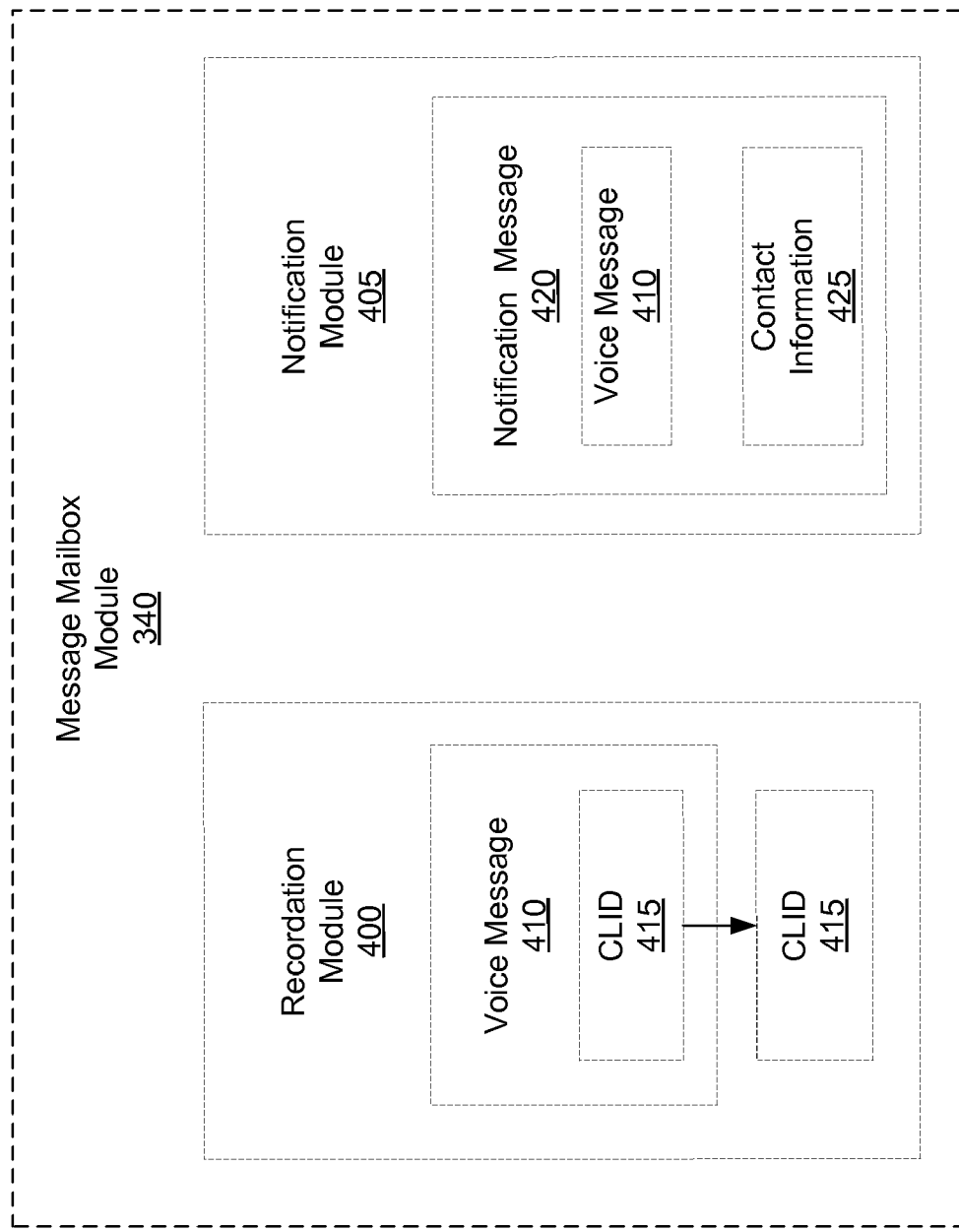
FIG. 4 shows example logical modules of a message mailbox module of a server device of FIG. 3.

The example RQM module 510 is configured to submit a CLID received from the optional prefix module 530 for query against one or more of the personal contact list 355 and the global contact list 370, collect matching records, and return processed query results to the notification module 405 of the message mailbox module 340 (see FIG. 4).

The RQM module 510 is additionally configured to submit a modified CLID as presented by the CMM module 505 for query against one or more databases accessed by the reverse look-up service 360, collect matching records if available, and return the query result to the notification module 405 of the message mailbox module 340.

For example, the RQM module 510 includes a query control module 535, a query format module 540, and a query results module 545.

The example query control module 535 is configured to selectively specify and control an order in which a query is submitted to the personal contact list 355, the global contact list 370, and one or more databases accessed by the reverse look-up service 360. In one example embodiment, the query control module 535 is configured to first query the global contact list 370 to resolve a CLID against normalized telephone number entries contained therein.

In the example embodiment, if no matching records are found within the global contact list 370, the query control module 535 is configured to secondly query the personal contact list 355. If no matching records are found within the personal contact list 355, the query control module 535 is optionally configured to thirdly submit a query of one or more databases accessed by the reverse look-up service 360. However, other embodiments, such as different querying orders, are possible as well.

The example query format module 540 is configured to format a query in accordance with the query resource (i.e., personal contact list 355, global contact list 370, reverse look-up service 360) specified by the query control module 535. For example, the query format module 540 is configured to invert a CLID received from optional prefix module 530 for query submission against one or more of the personal contact list 355 and the global contact list 370. For example, a CLID "5552837" received from the optional prefix module 530 is inverted by the RQM module 510 to an inverted CLID "7382555".

The query format module 540 is further configured to modify a CLID as presented by the CMM module 505 for query against one or more databases accessed by the reverse look-up service 360. For example, the reverse look-up service 360 may require a CLID to conform to a specific format for query submission against one or more databases. For example, the reverse look-up service 360 may require the CLID "5552837" be extended to include the known national number prefix "1" and area code "303" (as described above) such that the extended CLID "13035552837" is submitted for efficient query against one or more databases. Other embodiments are possible as well.

The example query results module 545 is configured to collect matching records of a query as submitted by the query control module 535, determine a least ambiguous matching record, and return the least ambiguous matching record to the notification module 405 of the message mailbox module 340.

For example, the CLID "7382555" as inverted by query format module 540 and submitted by the query control module 535 for query against normalized indexed telephone numbers contained in one or more of the personal contact list 355 and global contact list 370 may return the following matching records.

"7382555" (query term)
"7382555303" (returned matching record 1)
"73825553031" (returned matching record 2)

The query results module 550 is configured to reverse the inverted CLID "7382555" to "5552837".

"5552837" (reversed query term)

The query results module 550 is further configured to invert the return matching records "7382555303" and "73825553031".

"3035552837" (inverted matching record 1)
"13035552837" (inverted matching record 2)

The example query results module 550 is further configured to incrementally append the reversed query term "5552837" to include known optional prefixes, such as for example:

"3035552837" (increment #1, area code "303" appended)
"13035552837" (increment #2, national number prefix "1" appended)

At each incremental stage, the query results module 550 compares the appended CLID to each of the inverted returned records "3035552837" and "13035552837".

"3035552837" (increment #1)
"3035552837" (inverted matching record 1: match)
"13035552837" (inverted matching record 2: match)

Above, the query results module 550 determines each of the returned results "3035552837" and "13035552837" matches the first increment "3035552837".

"13035552837" (increment #2)
"3035552837" (inverted matching record 1: no match)
"13035552837" (inverted matching record 2: match)

Above, the query results module 550 determines the inverted matching record 1 "3035552837" does not match the second increment "13035552837". However, the query results module 550 determines the inverted matching record 2 "13035552837" does match the second increment "13035552837".

In the example embodiment, the query results module 550 determined that both the inverted matching record 1 "3035552837" and the inverted matching record 2 "13035552837" match the reversed query term "5552837". The query results module resolves ambiguous results by applying a weighting to each result based on how specific matching optional prefixes are. For example, the optional prefixes "1" and "303" of result "13035552837" are more specific than the optional prefix "303" of "3035552837". In the example embodiment, the query results module 550 selects record "13035552837" as a least ambiguous result and forwards the result "13035552837" to the notification module 405 of the message mailbox module 340 for further processing, as described further below.

In example embodiments, optional prefixes are assigned a precedence. An example precedence list includes:

| Precedence Order | CLID Prefix |
| --- | --- |
| 1 | [+][DialPlan.InternationalAccessCodeI][DialPlan.CountryCode][DialPlan.NationalNumberPrefix] |
| 2 | [+][DialPlan.CountryCode][DialPlan.NationalNumberPrefix] |
| 3 | [+][DialPlan.CountryCode] |
| 4 | [DialPlan.InternationalAccessCodeI][DialPlan.CountryCode][DialPlan.NationalNumberPrefix] |
| 5 | [DialPlan.InternationalAccessCodeI][DialPlan.CountryCode] |
| 6 | [DialPlan.CountryCode][DialPlan.NationalNumberPrefix] |
| 7 | [DialPlan.CountryCode] |
| 8 | [DialPlan.NationalNumberPrefix] |
| 9 | [+] |
| 10 | [Empty] |

In the example embodiment, the characters "+" corresponds to a prefix commonly placed in front of an international access code. The characters "DialPlan.InternationalAccessCodeI" correspond to an international access code including a sequence of digits required to out of a country when making an international call. The characters "DialPlan.CountryCode" correspond to ITU-T sequence of digits used to dial into a country from outside. The characters "DialPlan.NationalNumberPrefix" correspond to a sequence of digits used within a country to reach other numbers within that country. The characters "Empty" correspond to a degenerate case in which no optional prefixes of a CLID.

The example precedence list specifies ambiguity of multiple matching records is resolved based on which respective matching record has the greatest number of optional prefixes.

Figure 6:
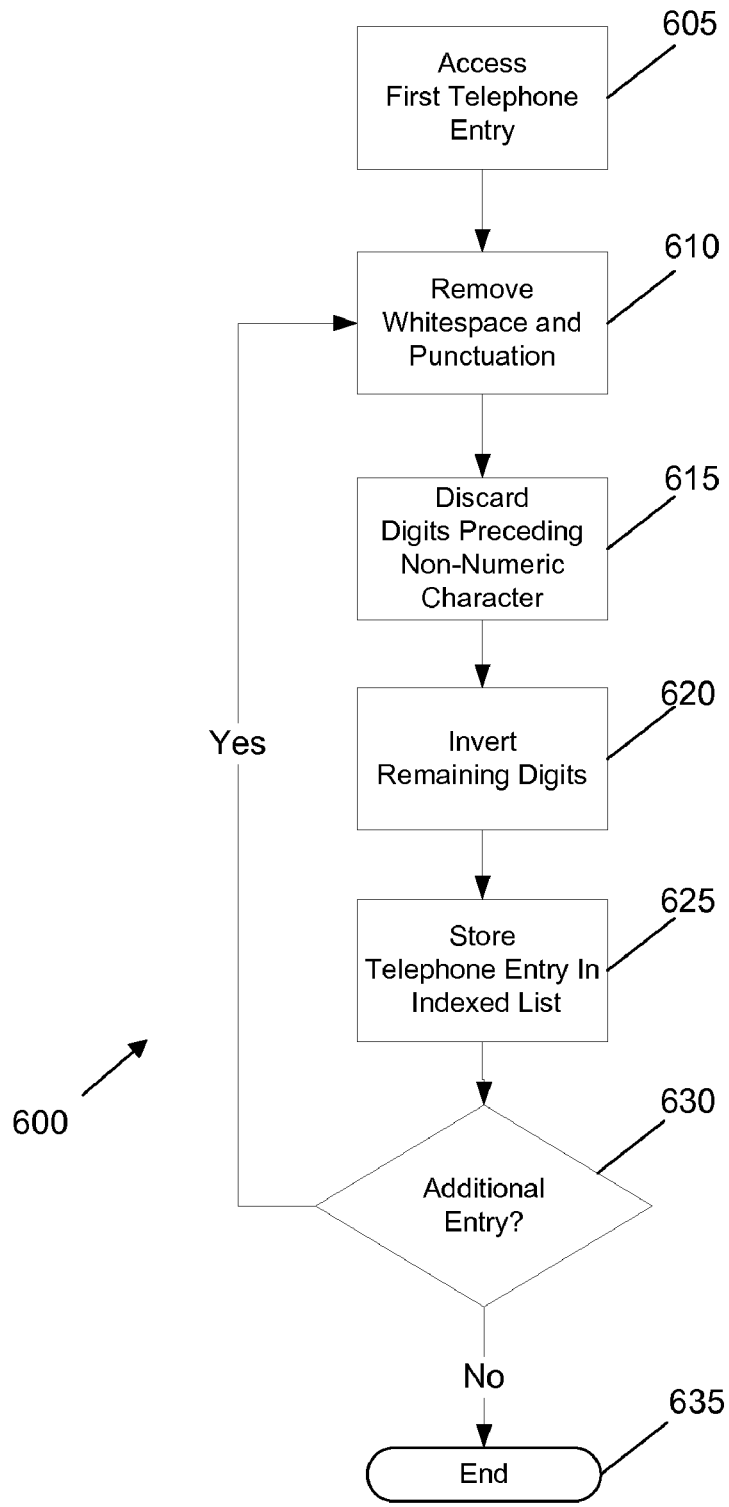
FIG. 6 shows a flowchart for an example method for batch conversion of telephone numbers into a list of normalized indexed values.

Referring now to FIG. 6, an example method 600 for converting telephone numbers into a list of normalized indexed values in "off-line" normalization and indexing process is shown. In example embodiments, the method 600 is implemented by the offline module 515 of the CLN module 500 executing on a server device similar to the server device described above in connection with FIGS. 1-5. However, other embodiments are possible as well.

The example method 600 begins at an operation 605, at which a first telephone entry in a telephone contacts list is accessed. In one embodiment, the telephone entry is contained in the global contact list 370 as shown in FIG. 3 above. However, other embodiments are possible. Operational flow then proceeds to an operation 610. At operation 610, white spaces and punctuation are removed from the telephone entry. Operational flow then proceeds to an operation 615. At operation 615, digits preceding a non-numeric character are removed from the telephone entry.

Operational flow then proceeds to an operation 620. At operation 620, remaining digits of the telephone number entry are inverted or reversed. Operational flow then proceeds to an operation 625. At operation 625, the telephone entry is stored in a multi-valued, indexed database list. Operational flow then proceeds to an operation 630. At operation 630, the global contact list 370 is analyzed to determine if the global contact list 370 contains an additional telephone entry.

If it is determined at operation 630 that the global contact list 370 does not contain an additional telephone entry, operational flow then proceeds to the end operation 635 which corresponds to termination of the example method 600. If it is determined at operation 630 that the global contact list 370 does contain an additional telephone entry, operational flow returns to operation 610 for normalization and indexing of the additional telephone entry.

In some embodiments, the example method 600 is periodically implemented. For example, in some embodiments, the example method 600 is implemented on a nightly basis to ensure telephone entries newly entered and/or modified over the course of working hours are in proper condition for a subsequent prefix-based query of a CLID against the normalized indexed values.

Figure 7:
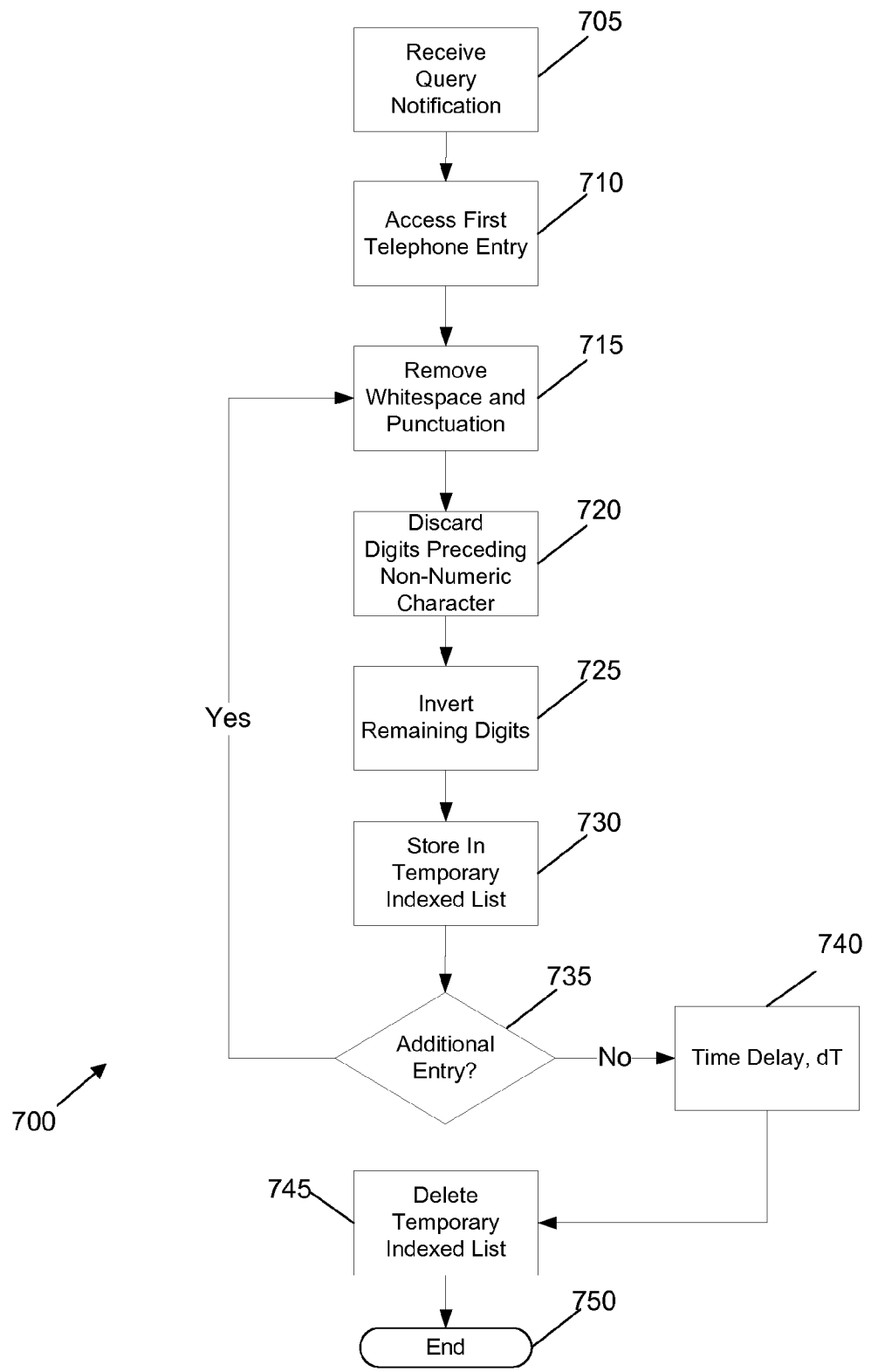
FIG. 7 shows a flowchart for an example method for on-demand conversion of telephone numbers into a list of normalized indexed values.

Referring now to FIG. 7, an example method 700 for converting telephone numbers into a list of normalized indexed values in an "on-demand" normalization and indexing process is shown. In example embodiments, the method 700 is implemented by the query time module 520 of the CLN module 500, in combination with the resource query module 510, executing on a server device similar to the server device described above in connection with FIGS. 1-5. However, other embodiments are possible as well.

The example method 700 begins at an operation 705. At operation 705, the resource query module 510 notifies the query time module 520 that an imminent query is to be submitted to a specific telephone contacts list. In example embodiments, the telephone contacts list is the personal contact list 355 as shown in FIG. 3 above. However, other embodiments are possible.

Operational flow proceeds to an operation 710, at which the query time module 520 accesses a first telephone entry in the personal contact list 355. Operational flow then proceeds to an operation 715. At operation 715, the query time module 520 removes white spaces and punctuation from the telephone entry. Operational flow then proceeds to an operation 720. At operation 720, the query time module 520 discards digits preceding a non-numeric character from the telephone entry. Operational flow then proceeds to an operation 725. At operation 725, the query time module 520 inverts the remaining digits of the telephone number entry.

Operational flow then proceeds to an operation 730. At operation 730, the query time module 520 stores the telephone entry in a temporary multi-valued, indexed database list.

Operational flow then proceeds to an operation 735. At operation 735, the query time module 520 examines the personal contact list 355 to determine if the personal contact list 355 contains an additional telephone entry.

If it is determined at operation 735 that the personal contact list 355 does contain an additional telephone entry, operational flow returns to operation 715 for normalization and indexing of the additional telephone entry.

If it is determined at operation 735 that the personal contact list 355 does not contain an additional telephone entry, operational flow then proceeds to a time delay operation 740. The time delay operation 740 corresponds to a period of time, dT, in which a query is submitted to the personal contact list 355 and results are returned to the resource query module 510.

Following the time delay operation 740, operation flow proceeds to an operation 745 in which the temporary multi-valued, indexed database is deleted. Operational flow then proceeds to an end operation 750 which corresponds to termination of the example method 700.

Figure 8:
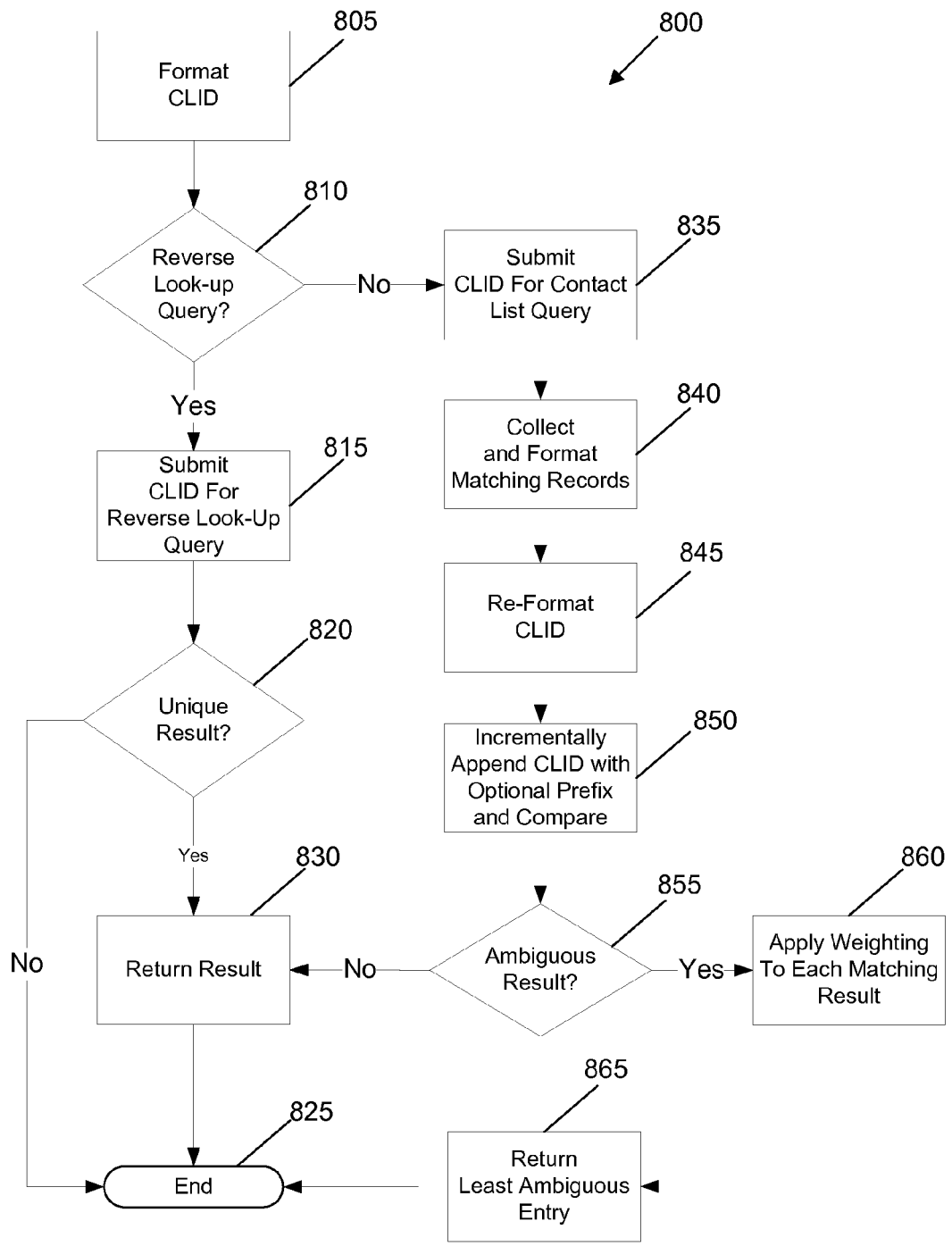
FIG. 8 shows a flowchart for an example method for resolving contact information associated with a CLID of calling party for insertion within a notification message.

Referring now to FIG. 8, an example method 800 for resolving contact information associated with a CLID of calling party for insertion within a notification message for a called party is shown. In example embodiments, the method 800 is implemented by components of the CLID resolution module 345 executing on a server device similar to the server device described above in connection with FIGS. 1-5. However, other embodiments are possible.

The example method 800 begins at an operation 805. At operation 805, a CLID is formatted for query against one or more data stores integrated within a computing system environment. For example, in some embodiments, a CLID is inverted, appended to include an optional prefix, or reduced by removing an optional prefix, for query submission against a contact list, such as the personal contact list 355 and the global contact list 370 shown in FIG. 3. In other embodiments, a CLID is modified to conform to a specific format for query submission against one or more databases by a reverse look-up service, such as the reverse look-up service 360 shown in FIG. 3.

Operational flow proceeds to an operation 810. At operation 810, it is determined if the CLID is for query submission against one or more databases by a reverse look-up service. For example, the reverse look-up service could be hosted externally by a third-party. Such queries could be option or eliminated, for example, if such services are unavailable because of network connectivity issues and/or downtime.

If it is determined at operation 810 that the CLID is for query submission against one or more databases by a reverse look-up service, operational flow proceeds to an operation 815 at which the CLID is sent to a reverse look-up service. Operational flow then proceeds to an operation 820. At operation 820, it is determined if a unique match to the CLID is found by the reverse look-up service. If it is determined at operation 820 that a unique match to the CLID has not been found, operational flow proceeds to an end operation 825 which corresponds to termination of the example method 800.

If it is determined at operation 820 that a unique match to the CLID has been found by the reverse look-up service, operational flow proceeds to an operation 830 in which the unique result is returned to a notification module (e.g., notification module 405) for further processing, such as described in further detail below in connection with FIG. 9. Operational flow then proceeds to the end operation 825.

If it is determined at operation 810 that the CLID is for query submission against a contact list, the CLID is submitted for query against a specified contact list at an operation 835. Operational flow proceeds to an operation 840. At operation 840, all matching records of the submitted query are collected and formatted for analysis. For example, in some embodiments, matching records are inverted for subsequent processing.

Operational flow proceeds to an operation 845. At operation 845, the CLID submitted for query submission at operation 835 is reformatted. For example, in some embodiments, the CLID is re-reversed for subsequent processing. Operational flow then proceeds to an operation 850. At operation 850, the CLID as modified at operation 845 is incrementally appended to include an optional prefix and compared to the matching records received at operation 840. At each incremental stage, all matching records are compared to the appended CLID.

Operational flow proceeds to an operation 855. At operation 855, it is determined if the incremental comparison of the matching records to the appended CLID at operation 845 yielded ambiguous results.

If it is determined at operation 855 that a non-ambiguous result is identified, operational flow proceeds to the operation 830 in which the non-ambiguous result is returned to a notification module for further processing. Operational flow then proceeds to the end operation 825.

If it is determined at operation 855 that an ambiguous result is identified, operational flow proceeds to an operation 860 in which a weighting is applied to each result based on respective matching optional prefixes robustness. Operational flow then proceeds to an operation 865 in which a least ambiguous result is returned to a notification module for further processing. Operational flow then proceeds to the end operation 825.

Figure 9:
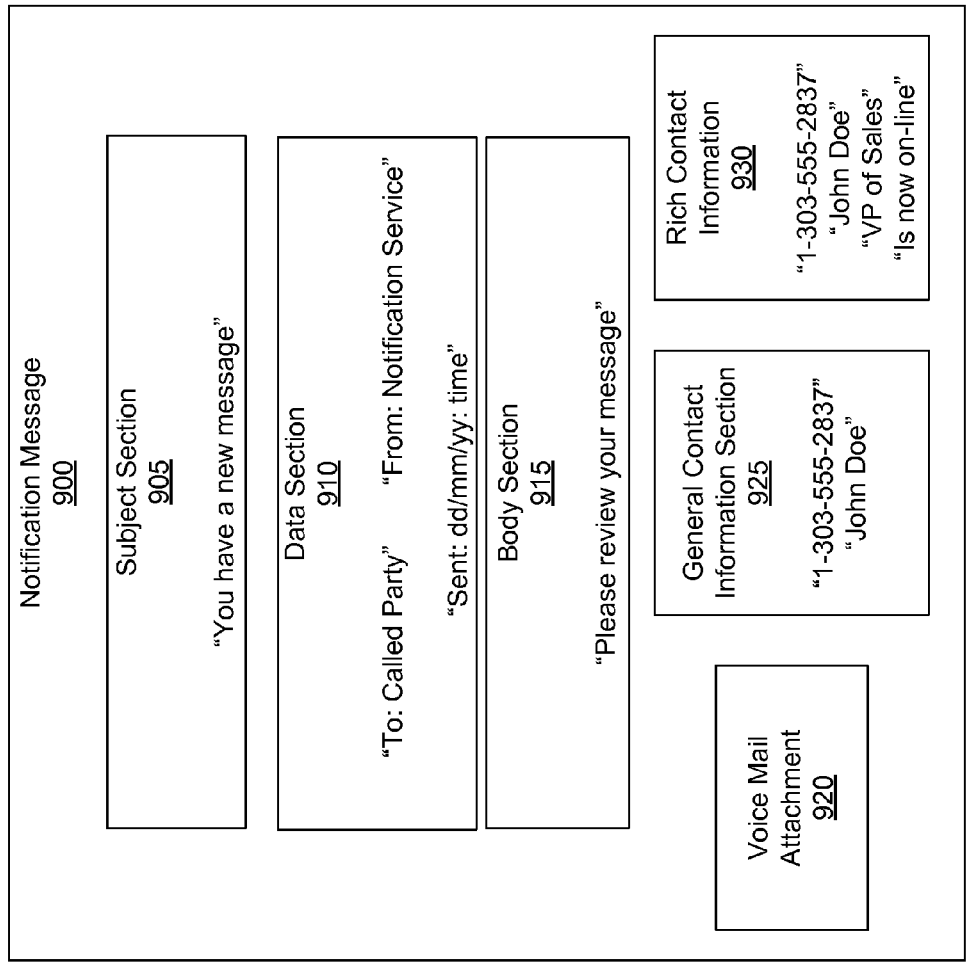
FIG. 9 shows an example notification message.

Referring now to FIG. 9, an example notification message 900 is shown according to the principles of the present disclosure. In some examples, the notification message 900 is an email message delivered to a mailbox on the Exchange server associated with the called party.

As mentioned above, a notification message (e.g., notification message 420) at least includes a voice message left from a calling party communication device to a called party communication device and contact information associated with a CLID as extracted from the corresponding voice message. The notification message is subsequently forwarded to the called party communication device to provide context and contact information related to the calling party.

The example notification message 900 includes a subject section 905, a data section 910, a body section 915, a voice mail attachment 920, a general contact information section 925, and a rich contact information section 930. Other embodiments are possible as well.

In some embodiments, the subject section 905 includes subject line information related to the notification message 900 (e.g., "You have a new message"). The example data section 910 may include sender information, recipient information, and time sent information (e.g., "To: Called Party" and "From: Notification Service" and "Sent: dd/mm/yy: time"). The example body section 815 may include text (e.g., "Please review your message").

The example voice mail attachment 920 includes an audio file or a link to an audio file corresponding to a voice mail message left from the calling party communication device to the called party communication device section.

In one embodiment, the example general contact information section 925 may include information contained within a CLID as received with the voice mail message left by the calling party communication device. In other embodiments, the general contact information section 925 may include information obtained from a reverse look-up service including contact information associated with the CLID as extracted from a respective voice message. For example, the general contact information section 925 may include a phone number extension "52837" and a name of the calling party "John Doe". Other embodiments are possible as well.

The example rich contact information section 930 may include information obtained from CLID resolution via a contact list such as personal contact list or a global contact. For example, example rich contact information section 930 may include a phone number "1-303-555-2837" and a name of a calling party "John Doe" along with other information associated with a CLID as received with the voice mail message left calling party communication device. For example, rich contact information section 930 may include a calling party address, a business title, an e-mail address, an on-line status, and other information. Still other embodiments are possible.

The example embodiments described herein can be implemented as logical operations in a computing device in a networked computing system environment. The logical operations can be implemented as: (i) a sequence of computer implemented instructions, steps, or program modules running on a computing device; and (ii) interconnected logic or hardware modules running within a computing device.

For example, the logical operations can be implemented as algorithms in software, firmware, analog/digital circuitry, and/or any combination thereof, without deviating from the scope of the present disclosure. The software, firmware, or similar sequence of computer instructions can be encoded and stored upon a computer readable storage medium and can also be encoded within a carrier-wave signal for transmission between computing devices.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing device programmed to deliver notification of a telephonic message, the computing device comprising:
 a processing unit;
 a system memory connected to the processing unit, the system memory including instructions that, when executed by the processing unit, cause the processing unit to:
  create a normalization module programmed to modify a contact list having a plurality of telephone numbers, wherein the normalization module modifies one or more of the telephone numbers in the contact list to conform to a specified format, the normalization module further programmed to:
   remove punctuation and whitespaces from each of the telephone numbers;
   discard digits appearing to a right of any non-numeric character of each of the telephone numbers; and
   invert remaining numbers of each of the telephone numbers;
  create a calling line manipulation module programmed to manipulate a calling line identification number to form a number for querying one or more databases including contact information; and
  create a resource query module programmed to query the databases including the contacting information using the number, receive one or more query results from the databases, and select one of the query results for inclusion in a notification of a telephonic message.

2. The computing device of claim 1, wherein the normalization module is programmed to normalize the telephone numbers in one of an off-line process and an on-demand process.

3. The computing device of claim 1, wherein the notification of the telephonic message includes rich information selected from one or more of the following: calling party name, address, title, e-mail address, phone number, and on-line status.

4. The computing device of claim 1, wherein the calling line manipulation module is further programmed to apply a mask to the calling line identification number.

5. The computing device of claim 1, wherein the calling line manipulation module is further programmed to remove optional prefixes from the calling line identification number.

6. The computing device of claim 5, wherein the resource query module is further programmed to apply a precedence to the optional prefixes.

7. The computing device of claim 1, wherein the resource query module is further programmed to send the query to a local contact database.

8. The computing device of claim 7, wherein the resource query module is further programmed to send the query to a reverse look-up database.

9. The computing device of claim 1, wherein the resource query module is further programmed to send the query to a local contact database and a reverse look-up database.

10. A method for resolving calling line identification information, the method comprising:

formatting each telephone number entry in a contact list;

discarding digits appearing to a right of any non-numeric character of each telephone number entry in the contact list;

inverting remaining digits of each telephone number entry in the contact list;

receiving a calling line identification number associated with a voicemail message;

formatting the calling line identification number;

querying the contact list based on the formatted calling line identification number;

reviewing the query results to identify an unambiguous result; and generating a notification to include contact information from the unambiguous result.

11. The method of claim 10, wherein formatting the contact list further includes:

removing white spaces and punctuation from each telephone number entry; and discarding digits preceding a non-numeric character in each telephone number entry.

12. The method of claim 11, wherein querying the contact list further includes inverting the calling line identification number to perform a prefix-based query.

13. The method of claim 10, wherein querying the contact list further includes inverting the calling line identification number to perform a prefix-based query.

14. The method of claim 10, further comprising applying a numbering plan mask to the calling line identification number.

15. The method of claim 10, further comprising removing optional prefixes from the calling line identification number.

16. The method of claim 15, further comprising applying a precedence to identify the unambiguous result.

17. The method of claim 10, further comprising sending rich contact information for the notification.

18. A computer readable storage medium having computer-executable instructions that, when executed by a computing device, cause the computing device to perform steps comprising:

removing white spaces and punctuation from each telephone number entry in a contact list;

discarding digits preceding a non-numeric character in each telephone number entry;

inverting remaining digits of each telephone number entry in the contact list;

receiving a calling line identification number associated with a voicemail message;

formatting the calling line identification number;

applying a numbering plan mask to the calling line identification number;

removing optional prefixes from the calling line identification number;

inverting the calling line identification number to form a formatted calling line identification number;

performing a prefix-based query on the contact list based on the formatted calling line identification number;

reviewing the query results to identify an unambiguous result; and generating a notification to include rich contact information from the unambiguous result.

* * * * *